US009185364B1

(12) United States Patent
Odierna et al.

(10) Patent No.: US 9,185,364 B1
(45) Date of Patent: Nov. 10, 2015

(54) SUB-SURFACE MARINE LIGHT UNIT WITH VARIABLE WAVELENGTH LIGHT EMISSION AND AN INTEGRATED CAMERA

(71) Applicants: Robert Odierna, Lighthouse Point, FL (US); Matthew Sailor, Pompano Beach, FL (US); Dmitry Kozko, Pompano Beach, FL (US)

(72) Inventors: Robert Odierna, Lighthouse Point, FL (US); Matthew Sailor, Pompano Beach, FL (US); Dmitry Kozko, Pompano Beach, FL (US)

( * ) Notice: Subject to any disclaimer, the term of this patent is extended or adjusted under 35 U.S.C. 154(b) by 0 days.

(21) Appl. No.: 14/548,844

(22) Filed: Nov. 20, 2014

(51) Int. Cl.
*H04N 9/47* (2006.01)
*H04N 7/18* (2006.01)
*B63B 45/02* (2006.01)
*B60Q 1/00* (2006.01)

(52) U.S. Cl.
CPC .............. *H04N 7/183* (2013.01); *B60Q 1/0023* (2013.01); *B63B 45/02* (2013.01)

(58) Field of Classification Search
USPC .......................................................... 348/148
See application file for complete search history.

(56) References Cited

U.S. PATENT DOCUMENTS

| 5,050,052 | A  | * | 9/1991  | Wade .............................. 362/101 |
| 2006/0017720 | A1 | * | 1/2006  | Li ..................... 345/419 |
| 2007/0076141 | A1 | * | 4/2007  | Domoto ........................... 349/69 |
| 2008/0142714 | A1 | * | 6/2008  | Nagai et al. .................... 250/332 |
| 2009/0135453 | A1 | * | 5/2009  | Wakisaka et al. ............. 358/474 |
| 2009/0290366 | A1 | * | 11/2009 | Jordan et al. .................. 362/477 |
| 2014/0301727 | A1 | * | 10/2014 | Resh ............................... 396/28 |

* cited by examiner

*Primary Examiner* — Tracy Li
(74) *Attorney, Agent, or Firm* — Patents on Demand P.A.; Brian K. Buchheit; Scott M. Garrett

(57) ABSTRACT

A lighting element of a sub-surface marine light unit can be manufactured with an integrated camera. The lighting element can include a light emitting component able to illuminate an area within a sub-surface environment and a camera configured to provide a view within an illuminated sub-surface area illuminated by the light emitting component. The camera can be housed within the enclosure of the lighting element. The light unit can be a thru hull marine light affixed to the sub-surface portion of a hull of a marine vessel and a movable light affixed to an apparatus of a marine vessel.

16 Claims, 11 Drawing Sheets

System 210

Sub-surface Environment 212
- Sub-surface Marine Light Unit 214
  - Camera 216
  - Light Emitting Component 217

Light Adjustment 218

Computing Device 220
- Light Controller 222
  - Light Settings 224

Sub-surface Data 219

Light Settings 224

| Visibility Threshold | Light Frequency |
|---|---|
| < .1 meters | 450nm |
| < .5 meters | 480nm |
| < 1 meter | 900nm |

500

Enclosure Retrofit Embodiment 510

Enclosure Retrofit Embodiment 520

Circuit Board Retrofit Embodiment 530

Camera Retrofit Embodiment 540

Embodiment 710

Embodiment 810

Embodiment 830

Embodiment 850

SUB-SURFACE MARINE LIGHT UNIT WITH VARIABLE WAVELENGTH LIGHT EMISSION AND AN INTEGRATED CAMERA

BACKGROUND

The present invention relates to the field of underwater marine vessel lighting and, more particularly, to a sub-surface marine light unit with variable wavelength light emission and an integrated camera.

Marine vessels such as boats and ships frequently utilize underwater lighting for navigation and aesthetics. These underwater lights are typically attached to the hull of the vessel and provide lighting in surrounding water. Lights can assist operators in docking the boat, divers locating boat, and even during entertainment during events. In many instances, lights can be ineffective when underwater conditions become cloudy due to debris and/or silt. What is needed is a mechanism for improving light performance in sub-optimal underwater conditions.

BRIEF SUMMARY

One aspect of the present invention can include a system, an apparatus, a computer program product, and a method for a sub-surface marine light unit with variable wavelength light emission and an integrated camera. A lighting element of a sub-surface marine light unit can be manufactured with an integrated camera. The lighting element can include a light emitting component able to illuminate an area within a sub-surface environment and a camera configured to provide a view within an illuminated sub-surface area illuminated by the light emitting component. The camera can be housed within the enclosure of the lighting element. The light unit can be a thru hull marine light affixed to the sub-surface portion of a hull of a marine vessel and a movable light affixed to an apparatus of a marine vessel.

Another aspect of the present invention can include a system, an apparatus, a computer program product, and a method for a sub-surface marine light unit with variable wavelength light emission and an integrated camera. A camera within a sub-surface marine light unit can be identified. The light unit can be a thru hull marine light affixed to the sub-surface portion of a hull of a marine vessel and a movable light affixed to an apparatus of a marine vessel. A view of a sub-surface environment can be obtained from a lense array of the camera. A quantity of environmental light within the sub-surface environment from the view can be determined. The light frequency emitted by the sub-surface marine light unit can be modified to improve the visibility of the view.

Yet another aspect of the present invention can include a method, an apparatus, a computer program product, and a system for a sub-surface marine light unit with variable wavelength light emission and an integrated camera. A sub-surface marine light unit can include a sealed enclosure and a lighting element. The lighting element can reside within the sealed enclosure. The sealed enclosure can be affixed to a portion of a marine vessel which during operation of the marine vessel within a marine environment places the enclosure within a sub-surface region of the marine environment. The lighting element can include a light emitting device and a camera. The camera can be configured to provide a view of the sub-surface region of the marine environment. A light controller can be configured to modify the wavelength of the light emitting device responsive to the visibility within the view.

DETAILED DESCRIPTION

Figure 1:
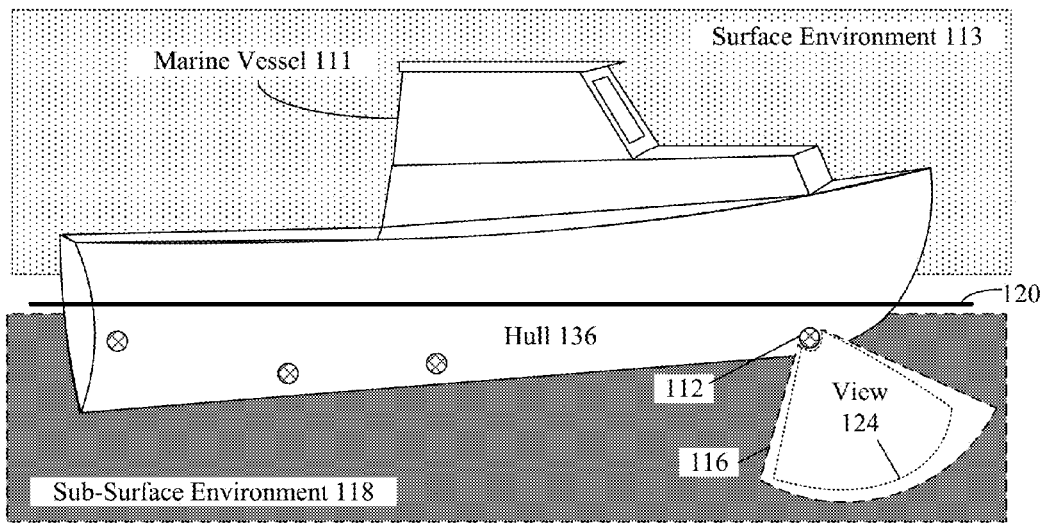
FIG. 1 is a schematic diagram illustrating a scenario and an embodiment for sub-surface marine light unit with variable wavelength light emission and an integrated camera in accordance with an embodiment of the inventive arrangements disclosed herein.
Figure 1:
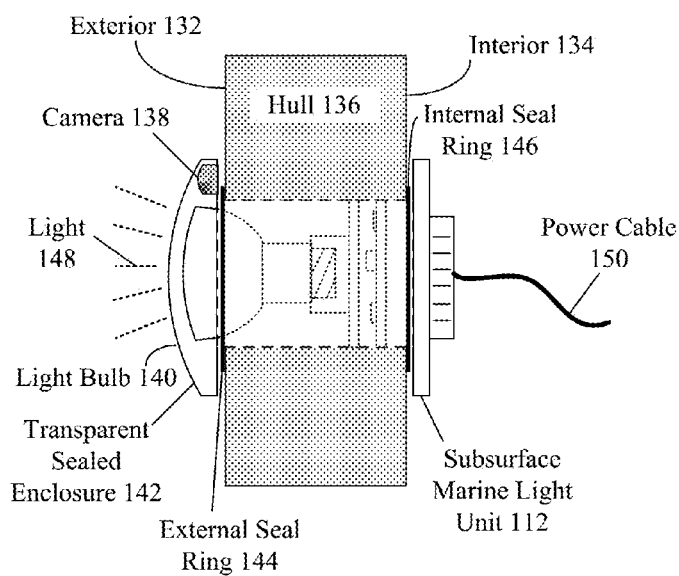
Figure 1:
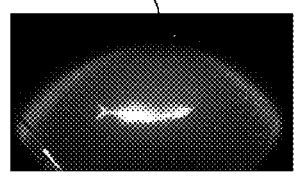

The present disclosure is a solution for a sub-surface marine light unit with variable wavelength light emission and an integrated camera. In the solution, a sub-surface marine light unit of a marine vessel can include an integrated camera which can provide a view of a sub-surface environment proximate to the marine vessel and/or light unit. The camera can be communicatively linked to a video and/or surveillance system which can permit monitoring of the sub-surface environment. The light unit can include one or more light emission components which can be automatically and/or manually adjusted based on the sub-surface environment conditions. In one instance, the wavelength of the light emission components can be changed to enhance a view provided by the camera when sub-surface conditions are non-optimal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 110 and an embodiment 130 for sub-surface marine light unit with variable wavelength light emission and an integrated camera in accordance with an embodiment of the inventive arrangements disclosed herein. Scenario 110 and/or embodiment 130 can be present in the context of system 210, 310, 410, embodiments 510, 520, 530, 540, 610, 710, 810, 830, 850, 910, 930, 1010, 1030, 1050, and/or method 1100.

As used herein, a marine vessel 111 can be an amphibious or aquatic vehicle able to travel within a marine environment. Vessel 111 can include, but is not limited to, a ship, a boats, a hovercraft, and a submarine, an autonomous underwater vehicle (AUV), a remotely operated underwater vehicle (ROV), a jet ski, underwater robots, seaplanes, and the like. Vessel 111 can include a hull 136 which can include thru hull marine light units 112. Light units 112 can provide illumination 116 within a sub-surface environment 118. For example, vessel 111 can include one or more down-facing hull mounted lights 112 which can cumulatively light the water surrounding the vessel 111.

Thru-hull marine light units 112 can be mounted through hull 136 as shown in embodiment 130. That is, a portion of the light unit 112 can be exposed to the exterior 132 of the hull via a mounting mechanism (e.g., ring) which tightens against the interior 134 of the hull. In the embodiment, light unit 112 can include a transparent sealed enclosure 142 which can include camera 138 and can permit light 148 emitted from bulb 140 to illuminate a sub-surface environment. It should be appreciated that transparent sealed enclosure can be airtight, waterproof, and the like. In one instance, enclosure can be pressurized to withstand multiple atmospheres of pressure associated with marine diving. It should be understood that enclosure can include anti-glare properties which can minimize excessive light from reaching camera 138. It should be appreciated that although enclosure 142 is represented as a domed (e.g., concave) enclosure, the enclosure can conform to any shape (e.g., flat, convex).

Unit 112 can include, but is not limited to, a power cable 150 an internal seal ring 146, an external seal ring 144, and the like. In one instance, unit 112 include one or more light emitting components able to illuminate a sub-surface environment 118. For example, unit 112 can include one or more light bulbs which can be used to light water surrounding the vessel (e.g., 116).

In the embodiment 130, camera 138 can convey a view 124 of an illuminated area to a display, a computing device, and the like. It should be appreciated that light 130 can include one or more additional components which can permit the functioning of light bulb 140 and/or operation of camera 138. For example, camera 138 can utilize a power cable 150 to provide communication to the camera 138 via one or more traditional (e.g., Power over Ethernet) and/or proprietary mechanisms. Additional elements can include timing mechanisms, heat dissipation elements, and the like.

As used herein, camera 138 can be an optical instrument which can record images that can be stored directly and/or transmitted to another location. Camera 138 can conform to traditional and/or proprietary underwater photographic equipment including, but not limited to, a watertight sealed enclosure, a flash, an aperture, an image sensor, and the like. Camera 138 can include characteristics such as aperture, focal length, depth of field, and the like. In one instance, camera 138 can include a pan capability, a tilt functionality, a zoom capability, and the like. In one embodiment, camera 138 can include wired capabilities, wireless functionality, and the like. In one instance, camera 138 can include, but is not limited to, thermal imaging, infrared capabilities, low light functionality, and the like. In one embodiment, camera 138 can include an array of lenses able to capture a high definition view 124 of environment 118. It should be appreciated that camera 138 resolution can meet or exceed Standard Definition (SD), High Definition (HD), Quad HD/4K (QHD), and the like.

Surface environment 113 can include a region of volumetric space at or above the water line 120. Sub-surface environment 118 can include a region of volumetric space at or below the water line 120. Environment 118 can include one or more conditions which can affect illumination and/or visibility. It should be appreciated that conditions can be attributed to ambient light reflection, ambient light refraction, silt, debris, biological matter, and the like. It should be appreciated that sub-surface can include a region proximate to the hull 136 but is not limited to any specific depth below the water line 120.

In scenario 110, a marine vessel 111 can operate within a marine environment which can include a surface environment 113 and a sub-surface environment 118. That is, vessel 111 can be a boat floating in a body of water which results in hull 136 residing within sub-surface environment 118 (e.g., below water line 120) and surface environment 113 (e.g., above water line 120). Hull 136 can include one or more sub-surface thru hull marine light units 112. Unit 112 can include a camera 138 and a light emitting component (e.g., light bulb 140) permitting a view 124 of environment 118 (e.g., embodiment 130). That is, light 116 from bulb 140 can illuminate a sub-surface region of environment 118 enabling camera 138 to capture view 124.

Drawings presented herein are for illustrative purposes only and should not be construed to limit the invention in any regard. It should be appreciated that sub-surface conditions 122 can range in visibility (e.g., from clear to murky), resulting in varying degrees of visibility within view 124. In one instance, light emitting components of marine light unit 112 can be adjusted to improve the visibility of view 124 as conditions 122 result in less visibility of environment 118 (e.g., FIG. 2). It should be appreciated that hull 136 materials can include, but is not limited to, fiberglass, wood, metal, and the like.

It should be appreciated that camera 138 can operate in one or more modes which can include real-time or near real time wireless transmission of video, delayed transmission (e.g., local storage and then periodically transmit), and the like.

Figure 2:
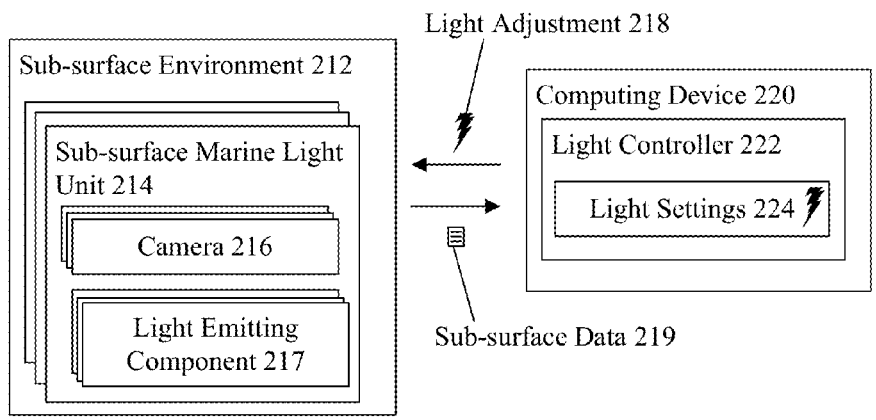
FIG. 2 is a schematic diagram illustrating a system for a sub-surface marine light unit with variable wavelength light emission and an integrated camera in accordance with an embodiment of the inventive arrangements disclosed herein.

FIG. 2 is a schematic diagram illustrating a system 210 for a sub-surface marine light unit with variable wavelength light emission and an integrated camera in accordance with an embodiment of the inventive arrangements disclosed herein. Embodiment 210 can be present in the context of scenario 110, embodiment 130, system 310, 410, embodiments 510, 520, 530, 540, 610, 710, 810, 830, 850, 910, 930, 1010, 1030, 1050, and/or method 1100.

In system 210, a marine light unit 214 attached to a marine vessel can include a camera 216 and light emitting component 217 which can operate within a sub-surface environment 212 (e.g., embodiment 130). The light emitting component 217 can be controlled by a light controller 222 communicatively linked to a computing device. For example, the light emitting component 217 can be controlled by a computer lighting software program executing within a tablet computing device (e.g., device 220) of a marine vessel. In one instance, the controller 222 can utilize camera 216 as an environmental light sensor to determine the visibility of a view (e.g., view 124) provided by the camera 216. In the instance, analyzing the view to determine a visibility reading which can correspond to one or more visibility threshold values (e.g., light settings 224) can be performed. In one configuration of the instance, a light adjustment 218 can be utilized to adjust the light emitting component 217 to improve visibility of the view. For example, the controller 222 can receive sub-surface data 219 which can indicate visibility conditions and can responsively convey light adjustment 218.

Light settings 224 can include, but is not limited to, a visibility threshold, a light frequency, and the like. For example, when the visibility of the sub-surface environment 212 is low (e.g., less than 0.1 meters), the controller can adjust the wavelength of the light from 450 nm (e.g., blue) to a non-visible portion of the electromagnetic spectrum 800 nm (e.g., infrared) to enhance visibility. In another instance, image processing can be performed on a view 124 provided by camera 216 to determine appropriate light settings 224. Adjustment 218 can conform to one or more traditional and/or proprietary formats including, but not limited to, serialized data formats, Extensible Markup Language, and the like.

In one embodiment, controller 222 can be linked to a navigation/propulsion system of a vessel. In the embodiment, controller 222 can utilize light emitting components 217 to emulate traditional braking lights of land based vehicles (e.g., cars, trucks). For example, when a vessel is at a full stop, the light controller can signal components 217 to emit red light. It should be appreciated that the embodiment is for exemplary purposes only and should not be construed to limit the embodiment in any regard.

Drawings presented herein are for illustrative purposes only and should not be construed to limit the invention in any regard. It should be appreciated that, in one embodiment, visibility and/or conditions can be discretely represented based on illumination distance. It should be understood that the representation can be achieved utilizing different metrics and/or readings.

Figure 3:
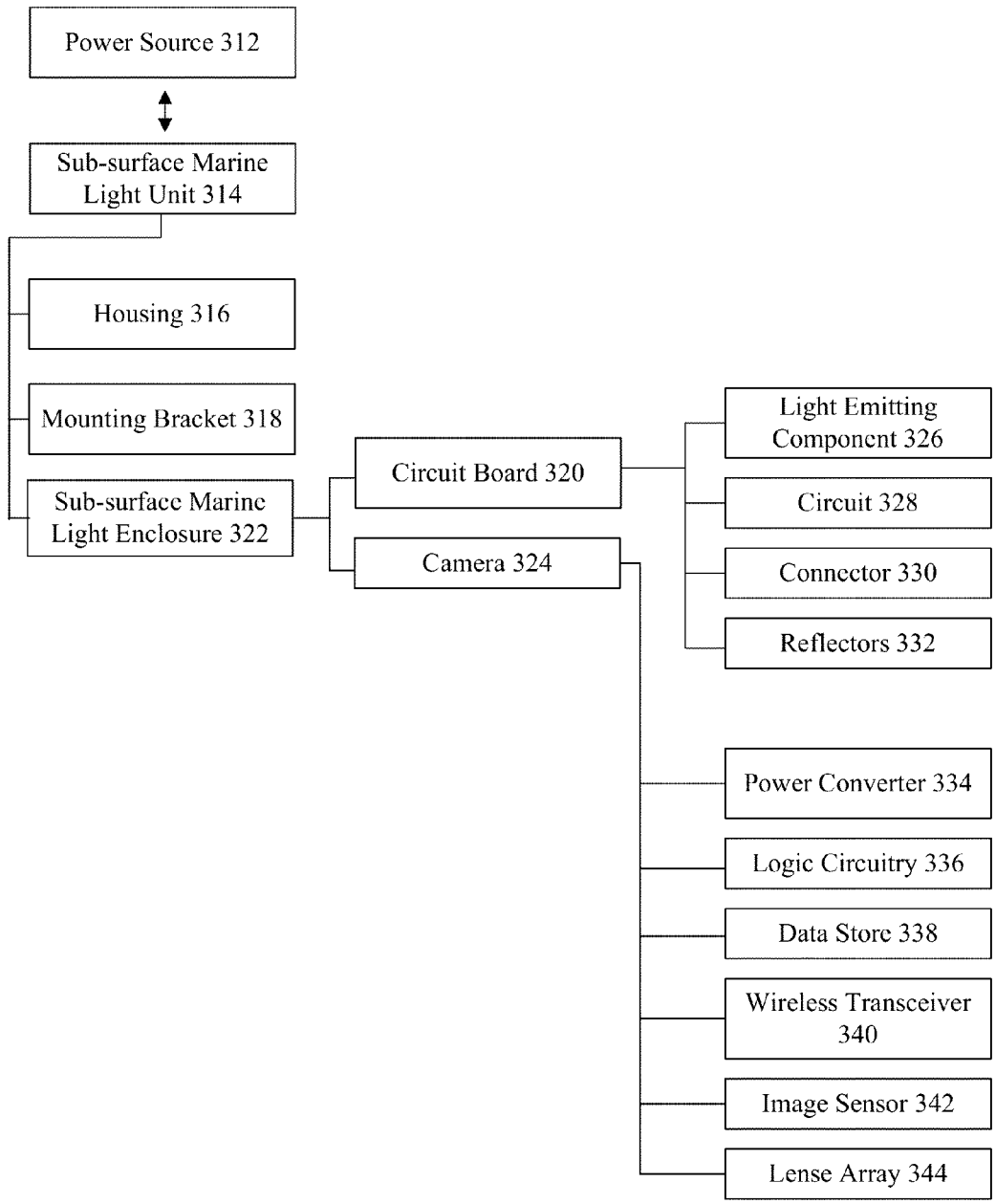
FIG. 3 is a schematic diagram illustrating a system for a sub-surface marine light unit with variable wavelength light emission and an integrated camera in accordance with an embodiment of the inventive arrangements disclosed herein.

FIG. 3 is a schematic diagram illustrating a system 310 for a sub-surface marine light unit with variable wavelength light emission and an integrated camera in accordance with an embodiment of the inventive arrangements disclosed herein. System 310 can be present in the context of scenario 110, embodiment 130, system 210, 410, embodiments 510, 520, 530, 540, 610, 710, 810, 830, 850, 910, 930, 1010, 1030, 1050, and/or method 1100.

System 310 can illustrate a structural organization of a sub-surface marine light unit 314 with an integrated wireless camera 324. It should be appreciated that the organization is exemplary and should not be construed to limit the system 310 arrangement and/or capabilities. Unit 314 can be connected to a power source 312 which can power electronic and/or electromechanical elements of the unit 314. Power source 312 can include, but is not limited to, a battery, an electrical system, an electrical generator, and the like.

In system 310, a sub-surface marine light unit 314 can include, but is not limited to, a housing 316, a mounting bracket 318, a sub-surface marine light enclosure 322, and the like. Enclosure 322 can include, but is not limited to, circuit board 320, camera 324, and the like. Circuit board 320 can include, but is not limited to, lighting elements 326, circuit 328, connector 330, reflectors 322, and the like. Camera 324 can include, but is not limited to, power converter 334, logic circuit 336, data store 338, wireless transceiver 340, image sensor 342, lense array 344, and the like. Wireless transceiver 340 can conform, but is not limited to, a WiFi transceiver, a Direct WiFi transceiver, a BLUETOOTH transceiver, and the like.

In one instance, wireless transceiver 340 can communicate a video stream to a computing device. In the instance, transceiver 340 can facilitate communication between electronic elements of unit 314 including, but not limited to, camera 324, light emission component 326, and the like.

Drawings presented herein are for illustrative purposes only and should not be construed to limit the invention in any regard. It should be appreciated that power source for the camera 324 can be an internal power source such as a battery. It should be understood that unit 314 can include additional elements including, but not limited to, a heat sink, a coupling mechanism, and the like. It should be appreciated that element 326 can include multiple HID bulbs, single color LEDs, multiple color LEDs, and the like.

Figure 4:
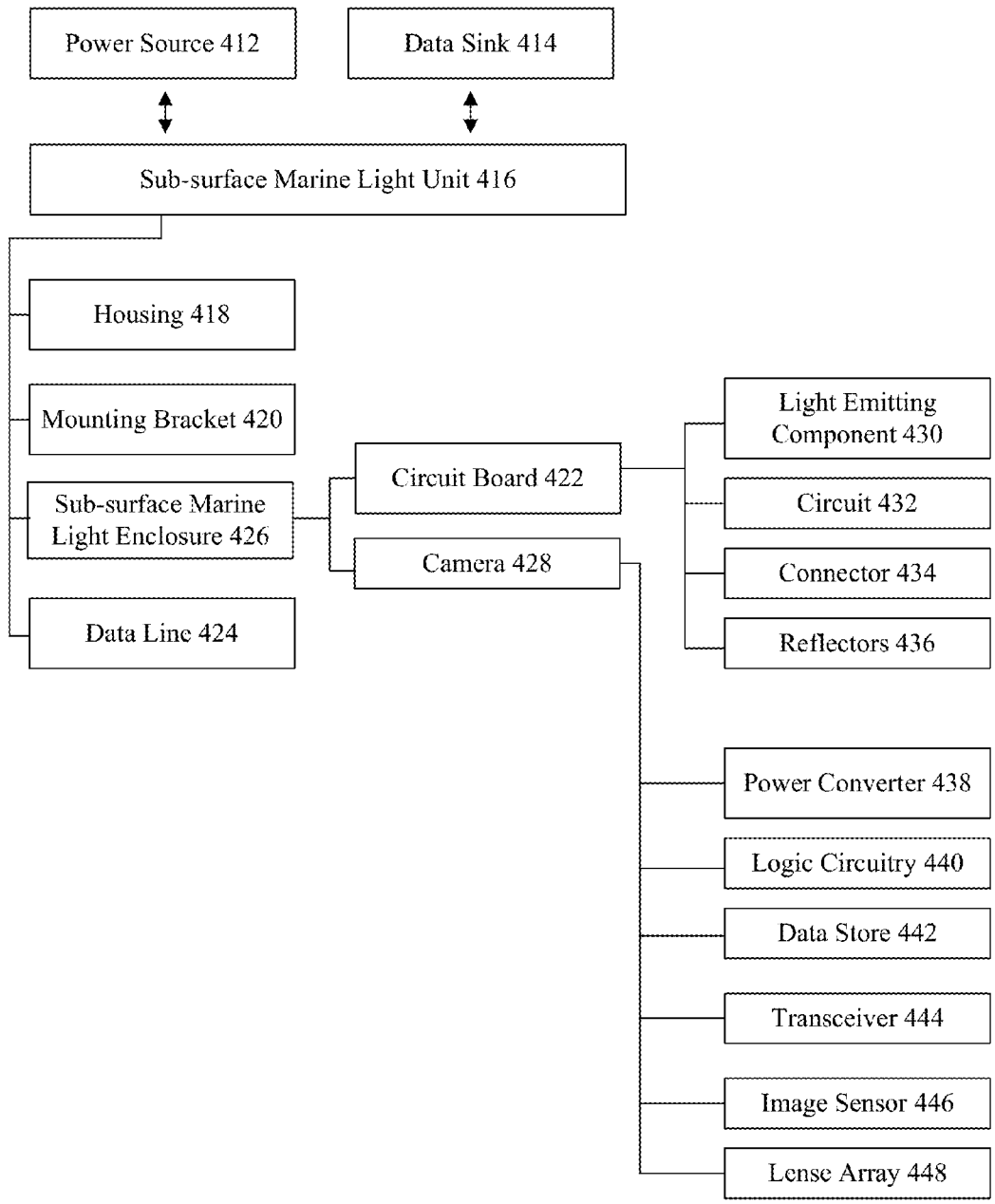
FIG. 4 is a schematic diagram illustrating a system for a sub-surface marine light unit with variable wavelength light emission and an integrated camera in accordance with an embodiment of the inventive arrangements disclosed herein.

FIG. 4 is a schematic diagram illustrating a system 410 for a sub-surface marine light unit with variable wavelength light emission and an integrated camera in accordance with an embodiment of the inventive arrangements disclosed herein. System 410 can be present in the context of scenario 110, embodiment 130, system 210, 310, embodiments 510, 520, 530, 540, 610, 710, 810, 830, 850, 910, 930, 1010, 1030, 1050, and/or method 1100.

System 410 can illustrate a structural organization of a sub-surface marine light unit 416 with an integrated wired camera 428. It should be appreciated that the organization is exemplary and should not be construed to limit the system 410 arrangement and/or capabilities. Unit 416 can be connected to a power source 312 which can power electronic and/or electromechanical elements of the unit 314. Unit 416 can be communicatively linked to a data sink 414 (e.g., cloud storage system). In system 410, a sub-surface marine light unit 416 can include, but is not limited to, a housing 418, a mounting bracket 420, a sub-surface marine light enclosure 426, data line 424, and the like. Enclosure 426 can include, but is not limited to, circuit board 422, camera 428, and the like. Circuit board 422 can include, but is not limited to, light emitting component 430, circuit 432, connector 434, reflectors 436, and the like. Camera 428 can include, but is not limited to, power converter 438, logic circuit 440, data store 442, image sensor 446, lense array 448, and the like.

Drawings presented herein are for illustrative purposes only and should not be construed to limit the invention in any regard. It should be appreciated that unit 416 can include ports for electrical connectivity, data connectivity, and the like. In one instance, unit 416 can include a Universal Serial Bus port, an Ethernet port, and the like. It should be appreciated that power source for the camera 428 can be an internal power source such as a battery. It should be understood that unit 416 can include additional elements including, but not limited to, a heat sink, a coupling mechanism, and the like. It should be appreciated that element 430 can include multiple HID bulbs, single color LEDs, multiple color LEDs, and the like.

It should be appreciated that communication protocols between camera 428 and data sink 414 can include, but is not limited to, Real-time Transport Protocol, User Datagram Protocol, Transport Control Protocol, and the like.

Figure 5:
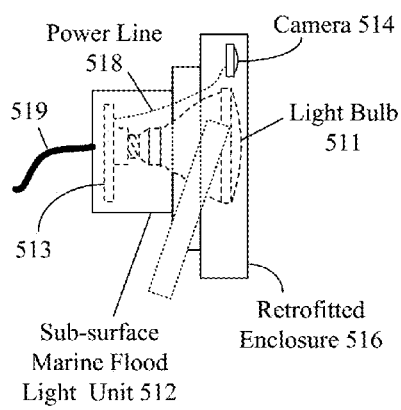
FIG. 5 is a schematic diagram illustrating a set of embodiments for a sub-surface marine light unit with variable wavelength light emission and an integrated camera in accordance with an embodiment of the inventive arrangements disclosed herein.
Figure 5:
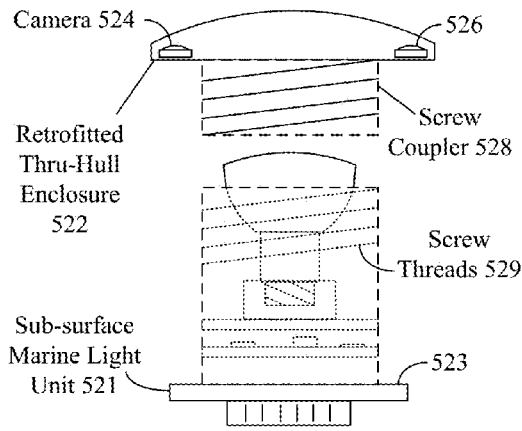
Figure 5:
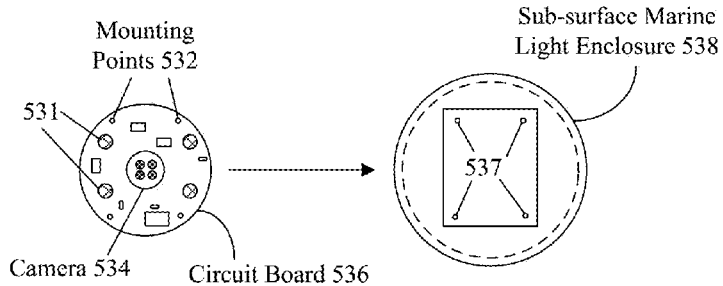
Figure 5:
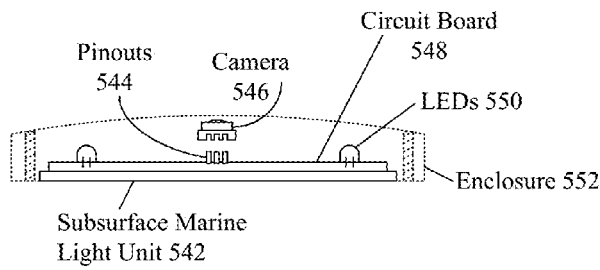

FIG. 5 is a schematic diagram illustrating a set of embodiments 510, 520, 530, 540 for retrofitting a sub-surface marine light unit with a camera in accordance with an embodiment of the inventive arrangements disclosed herein. Embodiment 510, 520, 530, 540, can be present in the context of scenario 110, embodiment 130, system 210, 310, 410, embodiments 610, 710, 810, 830, 850, 910, 930, 1010, 1030, 1050, and/or method 1100.

Embodiment 510 illustrates a side view of a sub-surface floodlight utilizing a light bulb 511 (e.g., halogen) and a camera 514 to provide a view of a sub-surface environment. In embodiment 510, a retrofitted enclosure 516 can replace a traditional enclosure to enable camera 514 to be retrofitted into flood light unit 512. Enclosure 516 can include a face plate, a housing, a watertight transparent enclosure, and the like. In one configuration, camera 514 can be wired to circuit board to provide power to the camera 514. For example, power line 518 can be soldered to a power source of circuit board 513 and camera 514 contacts to enable camera to receive power from an electrical cord 519 which can power flood light unit 512. In another configuration, camera 514 can be connected to a power source of board 513 via a traditional and/or proprietary contact header.

Embodiment 520 illustrates a side view of a thru-hull sub-surface marine light unit 412. Unit 412 can include a retrofitted thru-hull enclosure 522 which can be coupled to a housing 523 via a screw coupler 528. Coupler 528 can securely mate to screw threads 529 of housing 523 enabling housing 523 to be easily retrofitted with cameras 524, 526.

Embodiment 530 illustrates a top view of a sub-surface marine light enclosure 538. In embodiment 530, a traditional circuit board can be replaced by a retrofitted circuit board 536. Board 536 can include a camera 534 and light emitting components 531 (e.g., LEDs). Board 536 can utilize existing mounting points 537 to permit direct retrofitting of board 536. That is, mounting points 532 can be arranged to facilitate retrofitting any existing circuit boards of sub-surface marine light units.

Embodiment 540 illustrates a side view of a sub-surface marine light unit 542. In the embodiment, camera 546 can be directly mated to a set of pinouts 544 of circuit board 548. The camera 546 can be housed within the enclosure 522 which houses LEDs 550. In one instance, pinouts can provide power and/or data connectivity to the camera 546.

Drawings presented herein are for illustrative purposes only and should not be construed to limit the invention in any regard. It should be appreciated that the camera and/or light emitting components of the embodiments 510, 520, 530, 540 can be communicatively linked enabling camera to operate independently or in tandem with light emitting components. It should be understood that retrofitting embodiments described herein is non-exhaustive. Additional retrofitting embodiments are contemplated. In one instance, retrofitting can be performed from inside the hull without requiring removal of a sub-surface marine light unit.

Figure 6:
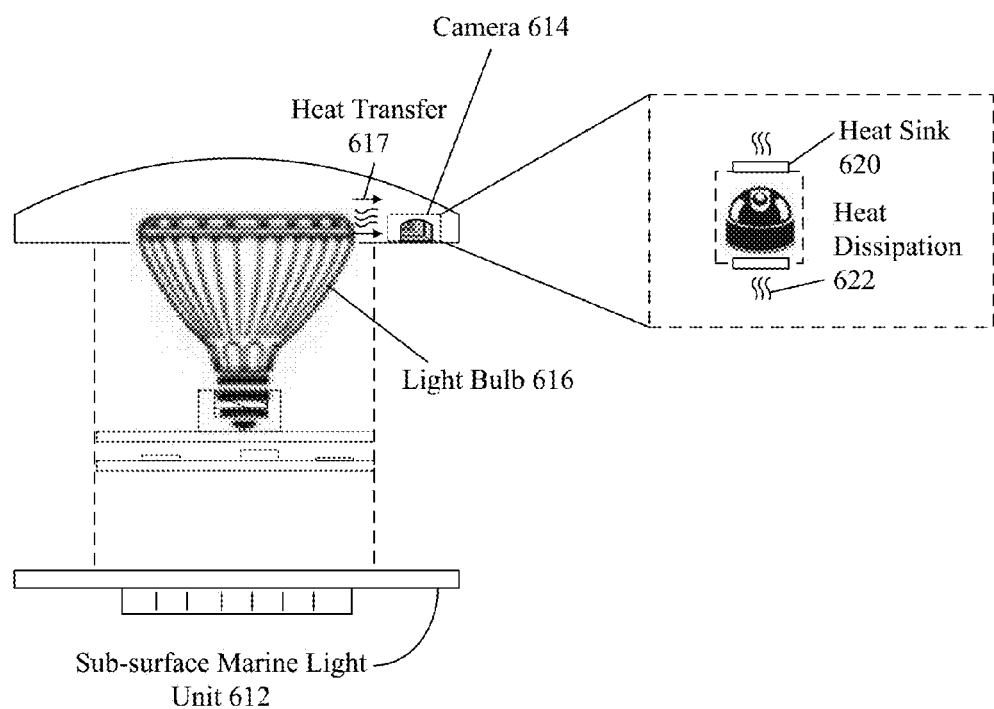
FIG. 6 is a schematic diagram illustrating an embodiment for a sub-surface marine light unit with variable wavelength light emission and an integrated camera in accordance with an embodiment of the inventive arrangements disclosed herein.

FIG. 6 is a schematic diagram illustrating an embodiment 610 for a sub-surface marine light unit with variable wavelength light emission and an integrated camera in accordance with an embodiment of the inventive arrangements disclosed herein. Embodiment 610 can be present in the context of scenario 110, embodiment 130, system 210, 310, 410, embodiments 510, 520, 530, 540, 710, 810, 830, 850, 910, 930, 1010, 1030, 1050, and/or method 1100.

Embodiment 610 illustrates a side view of a thru-hull sub-surface marine light unit 612. In embodiment 610, light bulb 616 can produce heat which can result in heat transfer 617 occurring. That is, heat generated from light bulb 616 can be transferred to camera 614. In one configuration of the embodiment, one or more heat sinks 620 can be utilized to enable heat dissipation 622. In the configuration, transferred heat 617 can be safely dissipated without affecting camera 614 operation. It should be appreciated that traditional heat piping mechanism can be used to reduce and/or eliminate heat transfer 616.

Drawings presented herein are for illustrative purposes only and should not be construed to limit the invention in any regard. It should be appreciated that embodiment 610 illustrates one embodiment for heat management associated with unit 612. Additional embodiments are contemplated which can be arbitrarily complex. In one configuration, the embodiment 610 can include an adaptive heat dissipation system based on light emitting component heat generation.

Figure 7:
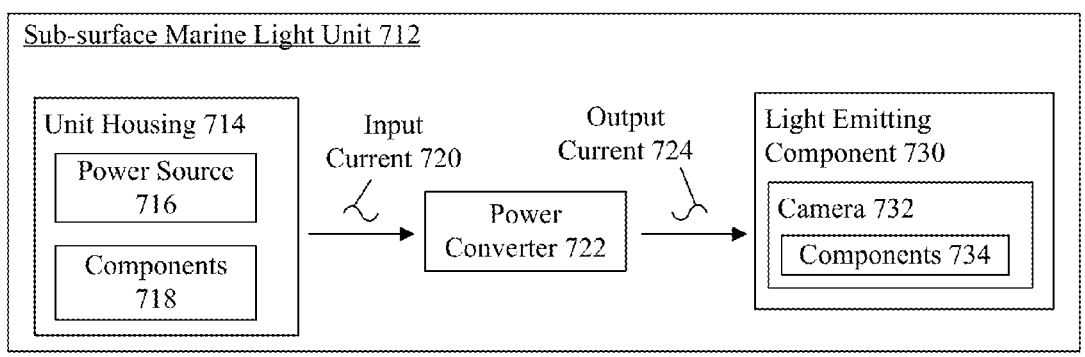
FIG. 7 is a schematic diagram illustrating an embodiment for a sub-surface marine light unit with variable wavelength light emission and an integrated camera in accordance with an embodiment of the inventive arrangements disclosed herein.

FIG. 7 is a schematic diagram illustrating an embodiment 710 for a sub-surface marine light unit with variable wavelength light emission and an integrated camera in accordance with an embodiment of the inventive arrangements disclosed herein. Embodiment 710 can be present in the context of scenario 110, embodiment 130, system 210, 310, 410, embodiments 510, 520, 530, 540, 610, 810, 830, 850, 910, 930, 1010, 1030, 1050, and/or method 1100

In embodiment 710, a sub-surface marine light unit 712 can include a unit housing 714 and a light emitting component 730. In the embodiment, a power converter 722 can be utilized to regulate an input current 720 from a power source 716 to power components 730 and/or camera 732. In one instance, the output current 724 from the converter can be received by camera 732 and/or components 734. It should be appreciated that housing 714 can include additional components 718.

Drawings presented herein are for illustrative purposes only and should not be construed to limit the invention in any regard. It should be understood that embodiment 710 can include one or more bulbs 730, power converters 722, and the like.

Figure 8:
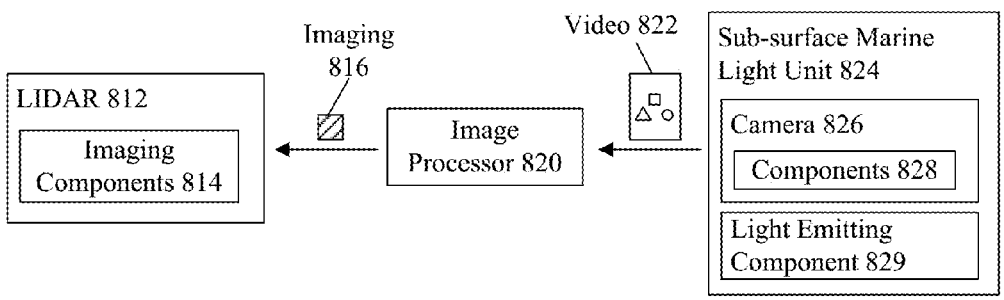
FIG. 8 is a schematic diagram illustrating a set of embodiments for a sub-surface marine light unit with variable wavelength light emission and an integrated camera in accordance with an embodiment of the inventive arrangements disclosed herein.
Figure 8:
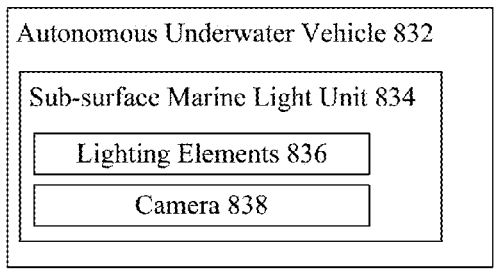
Figure 8:
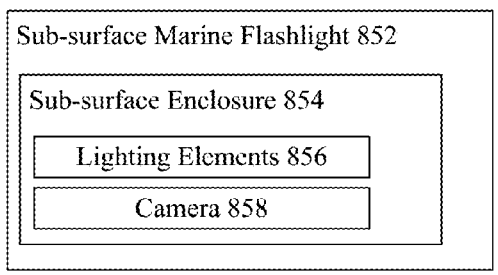

FIG. 8 is a schematic diagram illustrating a set of embodiments 810, 830, 850 for a sub-surface marine light unit with variable wavelength light emission and an integrated camera in accordance with an embodiment of the inventive arrangements disclosed herein. Embodiment 810 can be present in the context of scenario 110, embodiment 130, system 210, 310, 410, embodiments 510, 520, 530, 540, 610, 710, 910, 930, 1010, 1030, 1050, and/or method 1100.

In embodiment 810, a camera 826 within a sub-surface marine light unit 824 can assist a LIDAR 812 based system. In the embodiment, camera 826 and/or components 828 can capture video 822 of a sub-surface environment. It should be noted that light emitting component can be utilized to aid in the capture of video 822 (e.g., illumination of the sub-surface environment). Video 822 can be processed by an image processor 820 which can derive one or more imaging 816 data sets. The imaging 816 data sets can be compatible with imaging data used by imaging components 814. Imaging components 814 can receive imaging 816 data set and can be processed by the LIDAR 812 based system to produce a traditional and/or proprietary environment survey. That is, the camera 826 can serve as a backup sensing system when LIDAR 812 based system is insufficient.

As used herein, LIDAR can be a remote sensing technology which can measure distance by illuminating a target with a laser and analyzing the reflected light. It should be appreciated that LIDAR 812 system can include additional components including, but not limited to, a processor, a bus, a non-volatile memory, a volatile memory, a laser, a photodetector, optics, and the like.

In embodiment 830, a sub-surface marine light unit 834 which can include a camera 838 and lighting elements 836 can be integrated into an autonomous underwater vehicle 832. In one embodiment, the light unit 834 can be retrofitted into existing submersible lights of the vehicle 832.

In embodiment 850, a sub-surface marine enclosure 854 which can include a camera 858 and lighting elements 856 can be integrated into a sub-surface marine flashlight. In one embodiment, the enclosure 854 can be retrofitted into an existing underwater flashlight.

Figure 9:
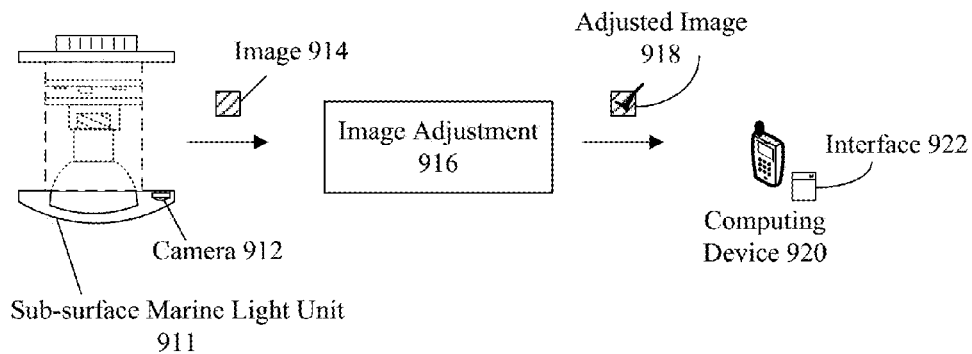
FIG. 9 is a schematic diagram illustrating a set of embodiments for a sub-surface marine light unit with variable wavelength light emission and an integrated camera in accordance with an embodiment of the inventive arrangements disclosed herein.
Figure 9:
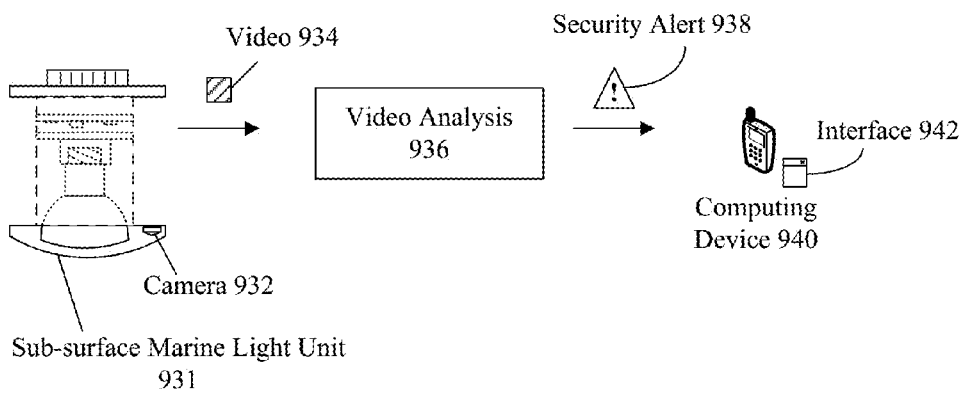

FIG. 9 is a schematic diagram illustrating a set of embodiments 910, 930 for a sub-surface marine light unit with variable wavelength light emission and an integrated camera in accordance with an embodiment of the inventive arrangements disclosed herein. Embodiment 910, 930 can be present in the context of scenario 110, embodiment 130, system 210, 310, 410, embodiments 510, 520, 530, 540, 610, 710, 810, 1010, 1030, 1050, and/or method 1100.

In embodiment 910, an image adjustment 916 can be performed on an image 916 from a camera integrated into a sub-surface marine light unit 911. The adjustment 916 can produce an adjusted image 918 which can be conveyed to computing device 920. Image adjustment 916 can include, but is not limited to, perspective correction, lighting correction, image enhancement, image analysis, aberration correction, and the like. For example, camera 912 can capture a wide angle view of a coral reef which can be image corrected for distortion and immediately presented on interface 922 of device 920.

In embodiment 930, a video analysis 936 can be performed on video 934 from a camera 932 integrated within a sub-surface marine light unit 931. In the embodiment, when video analysis 936 determines security threat, a security alert 938 can be conveyed to device 940. Analysis can include, but is not limited to, semantic analysis, object detection, motion detection, facial recognition, and the like. For example, camera 932 can analyze a video 934 to determine an intruder approaching a boat and convey a security alert 938 which can be present on interface 942 of device 940.

Drawings presented herein are for illustrative purposes only and should not be construed to limit the invention in any regard. It should be appreciated that adjustment 916, video analysis 936 can be performed by one or more proprietary and/or traditional software programs. In one instance, adjustment 916 and/or analysis 936 can be performed by a networked element (e.g., networked computer) or can be performed on device 920, 940. For example, adjustment 916 and/or analysis 936 can be performed by a communicatively linked smart digital video surveillance system.

Figure 10:
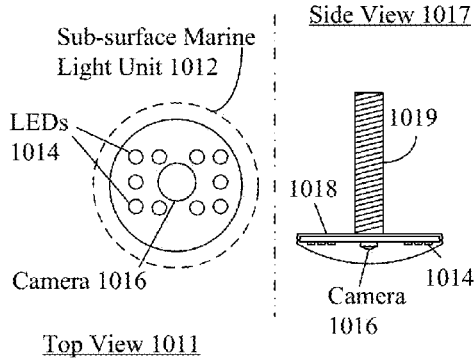
FIG. 10 is a schematic diagram illustrating a set of embodiments for a sub-surface marine light unit with variable wavelength light emission and an integrated camera in accordance with an embodiment of the inventive arrangements disclosed herein.
Figure 10:
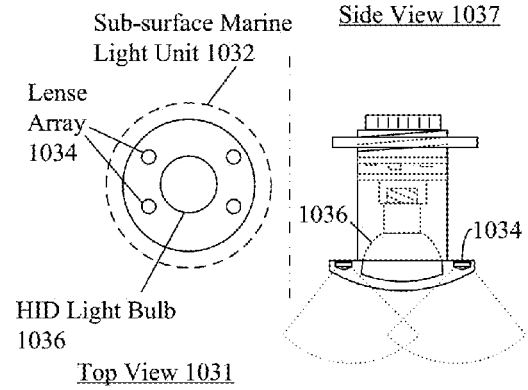
Figure 10:
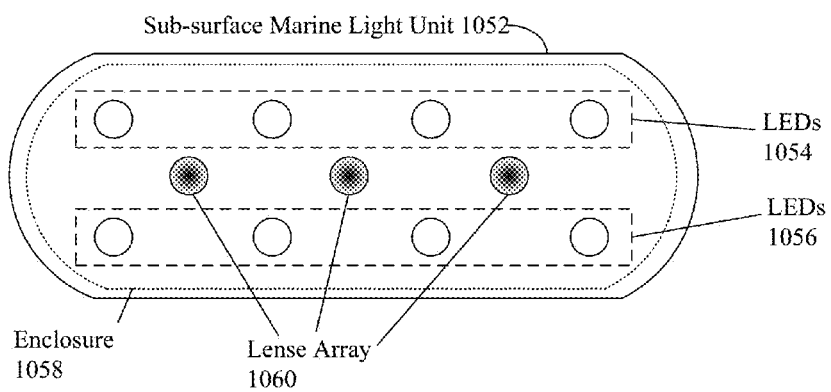

FIG. 10 is a schematic diagram illustrating a set of embodiments 1010 1030, 1050 for a sub-surface marine light unit with variable wavelength light emission and an integrated camera in accordance with an embodiment of the inventive arrangements disclosed herein. Embodiment 1010, 1030, 1050 can be present in the context of scenario 110, embodiment 130, system 210, 310, 410, embodiments 510, 520, 530, 540, 610, 710, 810, 910, 930, and/or method 1100.

Embodiment 1010 illustrates a top view 1011 and a side view 1017 of a sub-surface marine light unit 1012. In embodiment 1010, a sub-surface marine light unit 1012 can include LEDs 1014 and a camera 1016. In one instance, unit 1012 can include an enclosure 1018 and a screw based coupler 1018 which can permit attachment to a marine vessel (e.g., thruhull). In one instance, light unit 1012 can be self-contained including all necessary elements for operation within the enclosure 1018.

Embodiment 1030 illustrates a top view 1031 and a side view 1037 of a sub-surface marine light unit 1032. In embodiment 1030, a sub-surface marine light unit 1032 can include an HID light bulb 1036 and a lense array 1034. In one instance, light unit 1032 can be self-contained including all necessary elements for operation.

Embodiment 1050 illustrates a top view of a sub-surface marine light unit 1052. The unit 1052 can include one or more rows of LEDs 1054, 1056 which can be interspersed within an enclosure 1058. In the unit 1052, a lense array 1060 can be distributed throughout the enclosure to leverage light emitted from LEDs 1054, 1056. For example, array 1060 can be longitudinally distributed through the length of the enclosure and between the row of LEDs 1056, 1056 (e.g., center placement).

Drawings presented herein are for illustrative purposes only and should not be construed to limit the invention in any regard. It should be appreciated that marine light unit configuration, shape, and operation can vary from the embodiments described herein and should not be construed to limit the embodiments in any regard.

Figure 11:
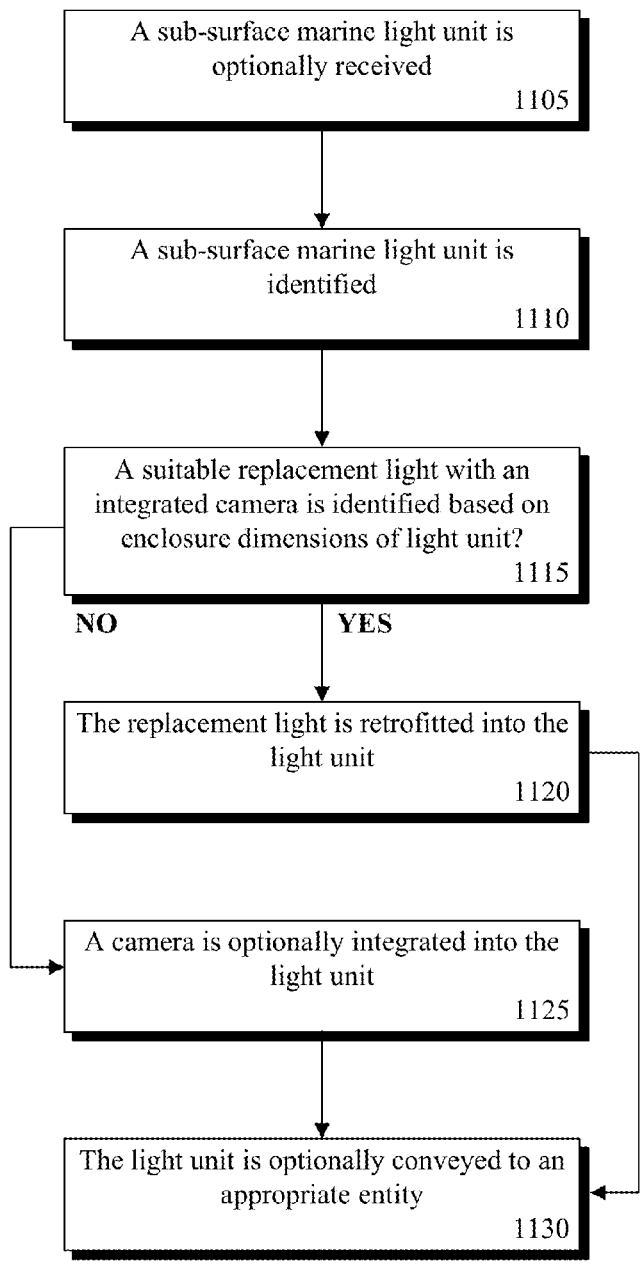
FIG. 11 is a schematic diagram illustrating a method for sub-surface marine light unit with variable wavelength light emission and an integrated camera in accordance with an embodiment of the inventive arrangements disclosed herein.

FIG. 11 is a schematic diagram illustrating a method 1100 for sub-surface marine light unit with variable wavelength light emission and an integrated camera in accordance with an embodiment of the inventive arrangements disclosed herein. Method 1100 can be performed in the context of scenario 110, embodiment 130, system 210, 310, 410, embodiments 510, 520, 530, 540, 610, 710, 810, 830, 850, 910, 930, 1010, 1030, 1050, and/or method 1100. In method 1100, a retrofitting service can permit traditional sub-surface marine lights owned by consumers to be "upgraded". It should be appreciated that the service can be performed by a technician on site (e.g., at a marina) or can be performed at a service facility (e.g., manufacturer facility, retail store). The retrofitting service can be a free or pay-per-use service. For example, consumers who own a thru-hull lights can mail qualifying lights to a manufacturer and can be provided with retrofitted lights by the manufacturer after retrofitting is performed.

In step 1105, a sub-surface marine light unit can be optionally received. In step 1110 a sub-surface marine light unit can be identified. In step 1115, if a suitable replacement light with an integrated camera can be identified based on the enclosure dimensions of the light unit, the method can continue to step 1120 else proceed to step 1125. In step 1120, the replacement light with an integrated can be retrofitted into the light unit. In step 1125, a camera can be optionally integrated into the light unit. In step 1130, the light unit can be optionally conveyed to an appropriate entity.

Drawings presented herein are for illustrative purposes only and should not be construed to limit the invention in any regard. It should be appreciated that method 200 can be performed in real-time or near real-time. Further, method 200 can be performed in serial and/or in parallel.

The flowchart and block diagrams in the FIGS. 1-11 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for retrofitting a subsurface marine light comprising:
   manufacturing a lighting element of a sub-surface marine light unit with an integrated camera, wherein the lighting element comprises of at least one light emitting component able to illuminate an area within a sub-surface environment and a camera configured to provide a view within an illuminated sub-surface area illuminated by the at least one light emitting component, wherein the camera is housed within the enclosure of the lighting element, wherein the light unit is at least one of a thru hull marine light affixed to the sub-surface portion of a hull of a marine vessel and a movable light affixed to an apparatus of a marine vessel, wherein the lighting element with an integrated camera is a retrofit for a traditional sub-surface marine light of the marine vessel, wherein the traditional sub-surface marine light lacks the integrated camera, wherein the retrofit with the lighting element and the integrated camera interfaces with a LIDAR based system to assist the LIDAR based system, wherein images received by the integrated camera are processed by the LIDAR based system.

2. The method of claim 1, wherein the camera is external to the light unit and is enclosed within a sealed enclosure affixed to the enclosure of the lighting element.

3. The method of claim 1, wherein the sub-surface marine light unit with an integrated camera comprises electronics that establish a visibility threshold associated with the view of the camera.

4. The method of claim 3, wherein the electronics are operable such that when the visibility of the view falls below the visibility threshold, the wavelength of the at least one light emitting component is changed to a different wavelength.

5. The method of claim 3, wherein the electronics are operable such that when the visibility of the view exceeds the visibility threshold, the wavelength of the at least one light emitting component is changed to a different wavelength.

6. The method of claim 1, wherein the camera comprises of a lens array, an image sensor, and a lens hood, wherein the lens hood obstructs light emitted from a proximate sub-surface marine light from reaching the lens of the camera.

7. A method for retrofitting a subsurface marine light comprising:

manufacturing a lighting element of a sub-surface marine light unit with an integrated camera, wherein the lighting element comprises of at least one light emitting component able to illuminate an area within a sub-surface environment and a camera configured to provide a view within an illuminated sub-surface area illuminated by the at least one light emitting component, wherein the camera is housed within the enclosure of the lighting element, wherein the light unit is at least one of a thru hull marine light affixed to the sub-surface portion of a hull of a marine vessel and a movable light affixed to an apparatus of a marine vessel, wherein the lighting element with an integrated camera is a retrofit for a traditional sub-surface marine light of the marine vessel, wherein the traditional sub-surface marine light lacks the integrated camera, wherein the sub-surface marine light unit with an integrated camera comprises electronics that establish a visibility threshold associated with the view of the camera, wherein the electronics are operable such that when a visibility of the view falls below the visibility threshold, the wavelength of the at least one light emitting component is changed to a different wavelength.

8. The method of claim 7, wherein the camera is external to the light unit and is enclosed within a sealed enclosure affixed to the enclosure of the lighting element.

9. The method of claim 7, wherein the retrofit with the lighting element and the integrated camera interfaces with a LIDAR based system to assist the LIDAR based system, wherein images received by the integrated camera are processed by the LIDAR based system.

10. The method of claim 7, wherein the electronics are operable such that when the visibility of the view exceeds the visibility threshold, the wavelength of the at least one light emitting component is changed to a different wavelength.

11. The method of claim 7, wherein the camera comprises of a lens array, an image sensor, and a lens hood, wherein the lens hood obstructs light emitted from a proximate sub-surface marine light from reaching the lens of the camera.

12. A method for retrofitting a subsurface marine light comprising:

manufacturing a lighting element of a sub-surface marine light unit with an integrated camera, wherein the lighting element comprises of at least one light emitting component able to illuminate an area within a sub-surface environment and a camera configured to provide a view within an illuminated sub-surface area illuminated by the at least one light emitting component, wherein the camera is housed within the enclosure of the lighting element, wherein the light unit is at least one of a thru hull marine light affixed to the sub-surface portion of a hull of a marine vessel and a movable light affixed to an apparatus of a marine vessel, wherein the lighting element with an integrated camera is a retrofit for a traditional sub-surface marine light of the marine vessel, wherein the traditional sub-surface marine light lacks the integrated camera, wherein the sub-surface marine light unit with an integrated camera comprises electronics that establish a visibility threshold associated with the view of the camera, wherein the electronics are operable such that when the visibility of the view exceeds the visibility threshold, the wavelength of the at least one light emitting component is changed to a different wavelength.

13. The method of claim 12, wherein the camera is external to the light unit and is enclosed within a sealed enclosure affixed to the enclosure of the lighting element.

14. The method of claim 12, wherein the retrofit with the lighting element and the integrated camera interfaces with a LIDAR based system to assist the LIDAR based system, wherein images received by the integrated camera are processed by the LIDAR based system.

15. The method of claim 12, wherein the electronics are operable such that when a visibility of the view falls below the visibility threshold, the wavelength of the at least one light emitting component is changed to a different wavelength.

16. The method of claim 12, wherein the camera comprises of a lens array, an image sensor, and a lens hood, wherein the lens hood obstructs light emitted from a proximate sub-surface marine light from reaching the lens of the camera.

* * * * *